No. 743,986.  
Patented November 10, 1903.

UNITED STATES PATENT OFFICE.

ARTHUR NICOLAIER AND PAUL HUNSALZ, OF BERLIN, GERMANY, ASSIGNORS TO CHEMISCHE FABRIK AUF ACTIEN, VORM. E. SCHERING, OF BERLIN, GERMANY.

METHYLENE-HIPPURIC ACID AND PROCESS OF MAKING SAME.

SPECIFICATION forming part of Letters Patent No. 743,986, dated November 10, 1903.

Application filed June 11, 1903. Serial No. 161,025. (Specimens.)

*To all whom it may concern:*

Be it known that we, ARTHUR NICOLAIER, doctor of medicine, and PAUL HUNSALZ, chemist, doctor of philosophy, residing at Berlin, Germany, have invented a new and useful Improvement in Processes of Making Methylene-Hippuric Acid, of which the following is a specification.

According to our invention methylene-hippuric acid which is of use in therapeutics is manufactured by causing means of methylenation to react upon hippuric acid—for example, by dissolving hippuric acid in sulfuric acid and adding polymeric formaldehyde in excess or less advantageously by heating hippuric acid with a solution of formaldehyde with or without the use of means for condensation, &c.

In the reaction of formaldehyde upon hippuric acid the methylene radical attaches itself both to the imido group and to the carboxylic group. Methylene-hippuric acid may, for example, be manufactured as follows: One hundred grams of hippuric acid is shaken with seventy-five grams of paraformaldehyde and five hundred grams of concentrated sulfuric acid until dissolved and is allowed to stand at the ordinary temperature for four days. The mixture is then poured into ice and the precipitate filtered off. This precipitate is then thoroughly mixed with a cold solution of sodium acetate in excess and filtered after standing for half an hour. The hippuric acid is thereby dissolved, while the product of the reaction remains behind.

Methylene-hippuric acid is a white crystalline powder, being difficultly soluble in water, more easily soluble in hot benzol and petroleum ether. The compound crystallizes out of hot acetic ether, in which it is very easily soluble in prismatic crystals, which melt at about 151° centigrade. As this acid also only slowly dissolves in soda solution and is apparently decomposed, an ether-like derivative of hippuric acid is probably formed of the following constitution:

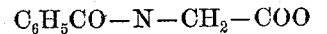

We claim as our invention—

1. As a new product the herein-described methylene-hippuric acid, being a white crystalline powder difficultly soluble in water, and melting at about 151° centigrade.

2. The herein-described process of manufacturing methylene-hippuric acid, which consists in causing means for methylenation to react upon hippuric acid, and isolating the resulting product, substantially as set forth.

In testimony whereof we have signed our names to this specification in the presence of two subscribing witnesses.

ARTHUR NICOLAIER.  
PAUL HUNSALZ.

Witnesses:  
WOLDEMAR HAUPT,  
HENRY HASPER.